(12) United States Patent
Stringfellow et al.

(10) Patent No.: US 8,688,574 B2
(45) Date of Patent: Apr. 1, 2014

(54) PAYMENT SYSTEM

(75) Inventors: Westley Stringfellow, London (GB); Peter Winfield-Chislett, Reading (GB); Itamar Lesuisse, London (GB); Raymond Tamblyn, London (GB); Verónica Casabonne, London (GB)

(73) Assignee: Visa Europe Limited, London (GB)

( * ) Notice: Subject to any disclaimer, the term of this patent is extended or adjusted under 35 U.S.C. 154(b) by 0 days.

(21) Appl. No.: 12/416,902

(22) Filed: Apr. 1, 2009

(65) Prior Publication Data
US 2010/0174620 A1 Jul. 8, 2010

(30) Foreign Application Priority Data
Jan. 8, 2009 (GB) .................................. 0900223.9

(51) Int. Cl.
*G06Q 40/00* (2012.01)
(52) U.S. Cl.
USPC .................. 705/40; 705/17; 705/44; 705/53; 705/77; 705/79
(58) Field of Classification Search
None
See application file for complete search history.

(56) References Cited

U.S. PATENT DOCUMENTS

| | | | | |
|---|---|---|---|---|
| 5,983,208 A * | 11/1999 | Haller et al. | ..................... | 705/40 |
| 6,092,053 A | 7/2000 | Boesch et al. | | |
| 6,609,113 B1 | 8/2003 | O'Leary et al. | | |
| 7,210,620 B2 | 5/2007 | Jones | | |
| 7,225,156 B2 * | 5/2007 | Fisher et al. | ..................... | 705/50 |
| 7,290,704 B1 * | 11/2007 | Ball et al. | ......................... | 705/39 |
| 7,831,521 B1 * | 11/2010 | Ball et al. | ......................... | 705/64 |
| 2002/0052853 A1 * | 5/2002 | Munoz | ............................ | 705/79 |
| 2002/0077837 A1 | 6/2002 | Krueger et al. | | |
| 2002/0103752 A1 * | 8/2002 | Berger et al. | ................... | 705/39 |
| 2002/0133467 A1 * | 9/2002 | Hobson et al. | ................... | 705/64 |
| 2003/0055781 A1 | 3/2003 | Ong | | |
| 2003/0126094 A1 * | 7/2003 | Fisher et al. | ..................... | 705/75 |
| 2004/0107146 A1 | 6/2004 | Alfano | | |
| 2005/0234833 A1 | 10/2005 | VanFleet et al. | | |
| 2005/0273431 A1 * | 12/2005 | Abel et al. | ....................... | 705/42 |
| 2006/0004658 A1 * | 1/2006 | Chau et al. | ...................... | 705/40 |
| 2006/0064376 A1 | 3/2006 | Ukigawa et al. | | |
| 2006/0287965 A1 | 12/2006 | Bajan | | |
| 2007/0288392 A1 * | 12/2007 | Peng et al. | ...................... | 705/72 |
| 2008/0040237 A1 | 2/2008 | Crussol et al. | | |
| 2008/0059367 A1 | 3/2008 | Anuszewski et al. | | |

FOREIGN PATENT DOCUMENTS

| | | | |
|---|---|---|---|
| EP | 0501697 B1 | 4/1999 | |
| EP | 1077436 A2 | 2/2001 | |
| EP | 1178451 A2 | 7/2001 | |
| EP | 0745961 B1 | 11/2001 | |

(Continued)

OTHER PUBLICATIONS

Search Report in GB 0900223.9 dated Apr. 27, 2009.

(Continued)

*Primary Examiner* — Fateh Obaid
(74) *Attorney, Agent, or Firm* — EIP US LLP

(57) ABSTRACT

Disclosed embodiments provide systems and methods of processing payment authorisation requests for payment transactions to be conducted via a data communications network. The method allows identification of an issuing bank from a plurality of issuing banks as one which is to be utilised in a given transaction and facilitate a user specifying, in real time in relation to the given transaction, a particular bank account that is to be used to deduct funds for that transaction.

24 Claims, 12 Drawing Sheets

(56) References Cited

FOREIGN PATENT DOCUMENTS

| | | |
|---|---|---|
| EP | 0901672 B1 | 11/2003 |
| EP | 1510984 A2 | 3/2005 |
| EP | 1107198 B1 | 1/2007 |
| EP | 1379045 B1 | 10/2007 |
| EP | 1887506 A1 | 2/2008 |
| EP | 1497947 B1 | 6/2009 |
| GB | 2397731 B | 2/2006 |
| GB | 2436043 B | 9/2009 |
| WO | WO 00/33219 | 6/2000 |
| WO | WO 00/67216 | 11/2000 |
| WO | WO 00/67219 | 11/2000 |
| WO | WO 01/43033 A1 | 6/2001 |
| WO | WO 01/59267 | 8/2001 |
| WO | WO 01/59630 A1 | 8/2001 |
| WO | WO 01/82246 A2 | 11/2001 |
| WO | WO 02/01447 A1 | 1/2002 |
| WO | WO 02/25495 A1 | 3/2002 |
| WO | WO 02/46976 A1 | 6/2002 |
| WO | WO 03/088078 A2 | 10/2003 |
| WO | WO 2004/086190 A2 | 10/2004 |
| WO | WO 2004/090819 A2 | 10/2004 |
| WO | WO 2004/114168 A1 | 12/2004 |
| WO | WO 2005/048032 A2 | 5/2005 |
| WO | WO 2005/107135 A1 | 11/2005 |
| WO | WO 2006/083825 A2 | 8/2006 |
| WO | WO 2007/125316 | 11/2007 |
| WO | WO 2008/007939 | 1/2008 |
| WO | WO 2008/089263 A2 | 7/2008 |
| WO | WO 2008/098163 A2 | 8/2008 |
| WO | WO 2008/106498 A1 | 9/2008 |
| WO | WO 2008/119168 A1 | 10/2008 |
| WO | WO 2008/123762 | 10/2008 |
| WO | WO 2008/127431 A2 | 10/2008 |
| WO | WO 2008/131021 | 10/2008 |
| WO | WO 2008/131021 A1 | 10/2008 |
| WO | WO 2009/002972 A2 | 12/2008 |
| WO | WO 2009/003030 A2 | 12/2008 |
| WO | WO 2009/011992 A1 | 1/2009 |
| WO | WO 2009/015222 A2 | 1/2009 |

OTHER PUBLICATIONS

Search Report in PCT/EP2010/050158 dated Jan. 8, 2010.

* cited by examiner

PAYMENT SYSTEM

CROSS-REFERENCE TO RELATED APPLICATIONS

This application claims priority under 35 U.S.C. §119(a) to Great Britain application no. GB 0900223.9, filed Jan. 8, 2009, the entire disclosure of which is incorporated by reference herein.

BACKGROUND OF THE INVENTION

1. Field of the Invention

The present invention relates to a payment system and method of processing payment authorization requests for payment transactions to be conducted via a data communications network, and is particularly, but not exclusively, suited to payment authorization requests being conducted as a result of orders by financial account holders via a plurality of different online merchant systems.

2. Description of the Related Technology

Users are increasingly encouraged to purchase goods online, i.e. via the Internet and associated technologies. Generally speaking, existing online payment systems fall into one of four types of arrangement: in a first type of arrangement, an online merchant system collects payment details from a financial instrument holder, otherwise known as a buyer or cardholders without the buyer dealing directly with any other entity that may be involved in the transaction, and the online merchant system sends the transaction details directly to their acquiring bank system. In a second type of arrangement, the online merchant system collects payment details from a buyer without the buyer dealing directly with any other entity that may be involved in the transaction, and the online merchant system sends the transaction details to a online merchant Internet Payment Service Provider (merchant IPSP system) which processes payment authorizations on behalf of the merchant. The merchant IPSP system subsequently transmits the details to the online merchant's acquiring bank system; the details may be transmitted directly to the acquiring bank or to a payment processor which acts on behalf of the acquiring bank. Examples of merchant IPSP systems which provide support for this second type of arrangement include the Protx™ Veri-Secure Payment system (VSP).

An advantage of using a payment gateway such as the afore-mentioned merchant IPSP system is that the merchant IPSP system can provide one or more additional various transaction processing functions, for example settlement, handling of chargebacks, handling of refunds, and transaction reporting, on behalf of the online merchant. In the settlement procedure, the merchant IPSP system submits all the online merchant's approved authorizations collected over a given period, in a "batch", to the online merchant's acquiring bank system for settlement. A chargeback is a reversal of a payment card transaction initiated by the buyer or the bank that issued the card used in the purchase. This differs from a refund, which is agreed to and initiated by the online merchant, via the merchant IPSP system. Transaction reporting involves providing an overview reporting function for accumulated transactions which have been authorized and optionally settled via the merchant IPSP system, so that a merchant can for example select a date range and see an overview relating to all transactions conducted within the selected date range. A merchant IPSP system may provide an online merchant with a secure online website whereby to approve chargebacks, initiate refunds and/or view transaction reports as described.

In a third type of arrangement the online merchant system redirects the buyer to an alternative payment system website with which the buyer interacts in order to complete the transaction. The alternative payment system interacts directly with the user who provides payment to the alternative payment system either directly from their bank account or via a mechanism such as a payment card. Where a payment card from a conventional payment scheme is used the alternative payment system performs the role of the merchant in the conventional payment system, submitting a payment demand through an acquiring system. Payment from the user is made to the alternative payment system. The alternative payment system is then responsible for any reimbursement of the merchant. In a second case, the alternative payment system can, in effect, behave as a conventional clearing house, funding a user's account within the alternative payment system from the user's actual issuing bank account by directly debiting their account. The alternative payment system subsequently ensures payment is sent to the merchant's issuing bank account, usually through a conventional clearing house. This merchant bank account may or may not be the same as their account held with their conventional acquiring system. Thus most of the time payment systems of the third type act as the intermediary to take actual funds from the user and pass them to the merchant, most usually via the consumer's and merchant's individual bank accounts, potentially holding on to those funds as they pass through accounts held by the payment system; an example of this third type of payment system includes the well known PayPal™ payment system. Such a payment system may also have the capability to operate as a conventional IPSP, for example by providing associated online payment handling services.

Whilst this type of payment system relieves the need for the user to set up individual payment accounts on a per online merchant basis, the user has a relationship with the alternative payment system and not with the online merchant system; this gives rise to several notable disadvantages: firstly the online merchant neither receives payment directly from an acquiring bank nor can avail itself of a payment-scheme based guarantee of payment, because for these transactions there is no direct relationship between the merchant and a card payment scheme. Secondly, for transactions effected via card payment the buyer does not have visibility of the individual online merchant from whom the product was bought (instead the card statement identifies the alternative payment system entity). Thirdly, the buyer is not protected by the card scheme's rules and may not be protected by any applicable consumer protection because the transaction is with the payment system, and not with the online merchant system When the user interacts solely with the merchant system, the merchant system typically obtains payment card data, bank account information and/or other financial data from the buyer. The merchant then passes this information either directly or via a payment gateway provided by a merchant IPSP system, to an acquiring bank processing system. Each merchant system is assigned a merchant account identifier by an acquiring bank, and this account identifier is used to identify the merchant to the acquiring bank when requesting authorization of a transaction. This requires each merchant system to implement its own payment processing capability, isolated from other merchants; as a result a buyer is required to provide their payment information separately for each merchant. Thus, for each new merchant that a buyer interacts with, the risk of exposure, misappropriation and/or fraudulent use of the buyer's financial data increases.

These known payment systems require that the user enters their account details on a per transaction basis or upon registration with the merchant IPSP, or alternative, non-IPSP, payment system; thus the user is the sole point of contact for procuring the relevant payment details. Whilst this is an accepted approach, account identifiers tend to be difficult to remember, and as a result users can generally only make purchases and/or sign up to payment services and merchant sites when they have their account details with them at the relevant point in time.

In a fourth type of arrangement of a payment system, an additional option is provided whereby a buyer is able to select to proceed to payment via their issuing bank, which provides an online banking website for such purposes. However, in this case the online merchant, or the merchant IPSP system acting on their behalf, needs to interface with the issuing bank system and moreover, the payment process, once transferred to the issuing bank, proceeds as a bill-payment type transfer directly from the user's transactional account (i.e. a current account or checking account) held by the issuing bank system. Hence, the fourth type or arrangement is not capable of providing the transaction processing functions available from existing merchant IPSP systems or from existing card scheme systems (such as Visa™ and Mastercard™).

SUMMARY OF CERTAIN INVENTIVE ASPECTS

In accordance with at least one embodiment of the invention, systems and software are provided for a method of processing payment authorization requests for payment transactions to be conducted via a data communications network, as specified in the independent claims. This is achieved by a combination of features recited in each independent claim. Accordingly, dependent claims prescribe further detailed implementations of the present invention.

More particularly, aspects of the invention provide a method of processing payment authorization requests for payment transactions to be conducted via a data communications network. The payment authorization requests are conducted as a result of orders by financial account holders via a plurality of different online merchant systems, wherein the financial account holders hold accounts with a plurality of different issuing banks. The method includes conducting an account identification procedure comprising identifying, from the plurality of different issuing banks, an issuing bank associated with a financial account holder and on the basis of the identification of the issuing bank, retrieving issuing bank transmission data to enable the transmission of account identification request data. The issuing bank transmission data is dependent upon the identified issuing bank and identifying a selected account identification system associated with the identified issuing bank. The method also includes transmitting on the basis of the retrieved issuing bank transmission data, an account identification request for use in the authorization of at least one payment transaction. The at least one payment transaction is initiated as a result of a financial account holder conducting at least one order via at least one online merchant system. An account idenficiation response is received in response to the account identification request. The account identification response identifies a financial account identity capable of being used in the at least one payment transaction.

Thus embodiments of the invention provide a way to identify an issuing bank from a plurality of issuing banks as one which is to be utilized in a given transaction. Embodiments of the invention also provide a a way for a user to specify, in real time in relation to the given transaction, a particular bank account that is to be used to deduct funds for that transaction. Preferably the user is authenticated in relation to their account, and thus provides an improvement over known systems in which a user has to either send payment details to a merchant system or provide details in advance of the transaction, e.g. to a third party entity to whom the user has previously authorized to handle the payment on their behalf.

It is to be understood that by issuing bank is meant a bank that holds an account on behalf of a user; that account may or may not be accompanied by a payment card, and indeed embodiments of the invention apply equally to users having accounts with their issuing banks for which cards are not issued. In general terms the issuing bank could be considered a paying entity (the payer) in the payment transaction.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 7-10 are schematic timing diagrams showing alternative message flows to that shown in FIG. 6; and.

DETAILED DESCRIPTION OF CERTAIN INVENTIVE EMBODIMENTS

As described above, embodiments of the invention are concerned with a payment system and method, specifically a system and method of processing payment authorization requests for payment transactions to be conducted via a data communications network, the payment authorization requests being conducted as a result of orders by financial account holders, via a user system such as a personal computer or other computing device, via a plurality of different online merchant systems.

Figure 1:
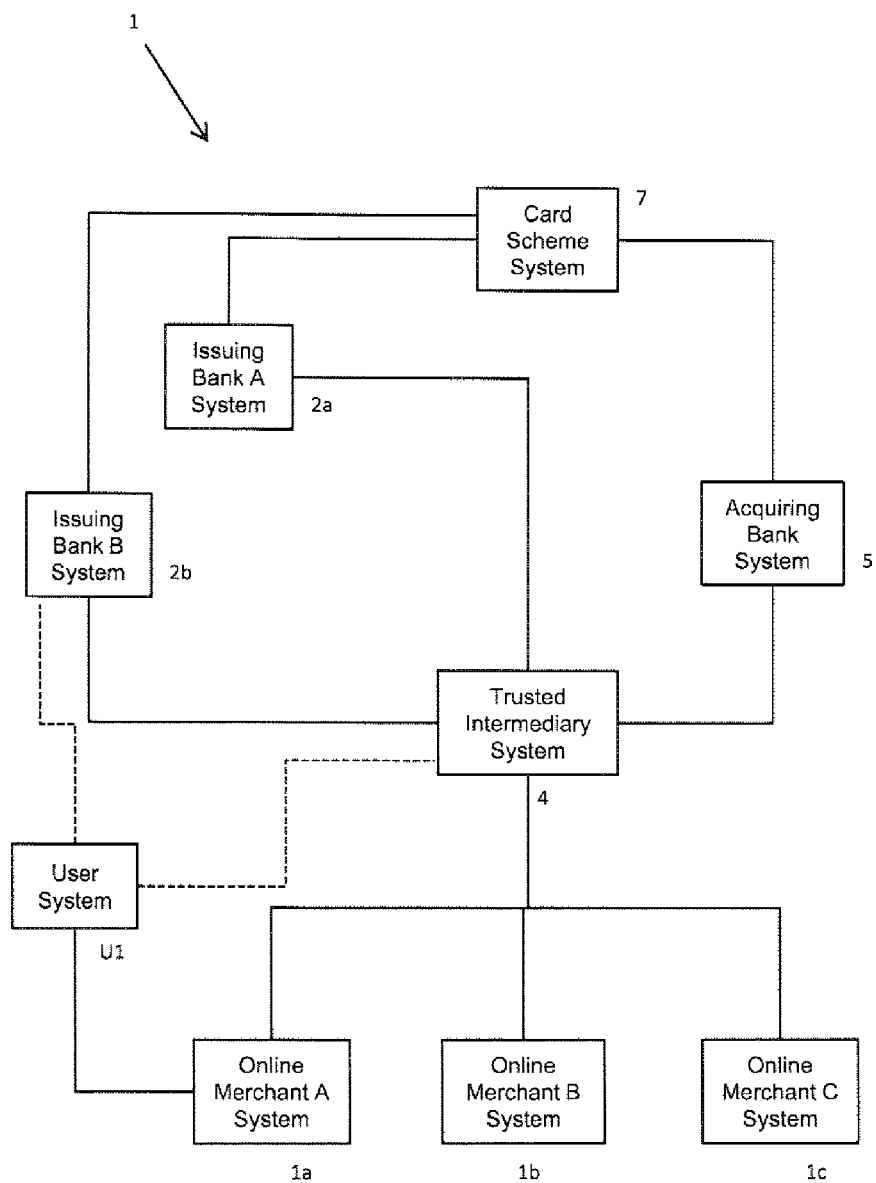
FIG. 1 is a schematic diagram showing a payment system according to a first embodiment of the invention.

FIG. 1 shows a payment system according to a first embodiment of the invention, in which the financial account holder, making use of user system U1, holds accounts with a plurality of different issuing banks 2a, 2b ; these issuing banks include banks that assign an appropriate debit card number to enable the payment to be routed back to the consumer's current account via the card scheme system to a user and assume the primary liability for the user's capacity to settle any debts incurred with the card. However, and as described above, this case of the issuing bank assigning a card to the user in conjunction with the user's bank account is to be considered a non-limiting example of an application of embodiments of the invention. As can be seen from the Figure, the user system U1 is connected via data communications links via which the financial account holder is able to enter into a transaction with one of a plurality of online merchant systems 1a, 1b, 1c when purchasing goods over the Internet. The online merchant systems are equipped with software that enables the user to select a payment method for purchase of their selected goods, and in embodiments of the invention, the payment selection software includes an option for the user system U1 to access a trusted intermediary system 4 whereby the financial account holder is able to specify a particular bank account from which payment is to be deducted.

In a preferred arrangement, selection of this option triggers the online merchant system 1a to redirect the user to the trusted intermediary system 4, this then commencing an account identification procedure involving the trusted intermediary system 4, the user U1 and one of the plurality of issuing banks 2a, 2b. Thus selection of the bank account option from the merchant's online shopping software effectively causes the user U1 to be redirected and communicate with the trusted intermediary system 4 and the relevant issuing bank 2b; these redirection steps are indicated by means of a dotted line in the Figure. The financial account holder, via the user system U1, is required to specify, for example via selection from a drop-down list or by entering data directly, an identifier of the issuing bank from which payment is to be deducted, e.g. in the form of country code and bank name (e.g. "GB" and "HSBC") or a code such as Bank Identifier Code (BIC), SWIFT code, or a Bank Routing Number (also known as an American Banking Association (ABA) Number), whereupon the trusted intermediary system 4 identifies the relevant issuing bank system 2b (e.g. by lookup of a table holding online banking web site details for a range of issuing banks) and redirects the user system U1 to communicate therewith. In an Internet-based arrangement this redirection may involve directing the user's browser to a web server associated with the issuing bank-conventionally referred to as an online banking login page. The financial account holder, via the user system U1, then logs into their online bank account in the normal way, essentially sending an account identification request for use in the authorization of at least one payment transaction.

As will be described in more detail below with reference to FIG. 6, the redirection occurs under the control of the trusted intermediary system 4, which is to say the web page that is displayed to the user is effectively encapsulated within a web page controlled by, or issued in association with, the trusted intermediary system 4. As a result, upon selection of an account from which payment is to be deducted, the trusted intermediary system 4 subsequently receives, from the issuing bank 2b, an account identification response identifying a financial account identity capable of being used in the transaction.

This account identification response can comprise a Primary Account Number (PAN) normally associated with the debit card linked to the user's account; it will therefore be appreciated that embodiments of the invention are particularly well suited for situations in which the user U1 desires payment to be effected from a payment instrument (typically cards and accounts). Once received by the trusted intermediary system 4, the PAN is then transmitted, in the form of a payment authorization request, to the acquiring bank 5 processor, or beneficiary, associated with the merchant 1 a, per conventional methods in which the user has entered payment details into the merchant's online system. The PAN is accompanied by the transaction information and the merchant's account identifier, and the card scheme system 7 routes the transaction to the very same card issuing bank 2b. The issuing bank 2b receives the authorization request and sends a response back to the processor of the merchant's acquiring bank 5 with a response code, whereupon the processor of the merchant's acquiring bank 5 forwards the response to the trusted intermediary system 4. The trusted intermediary system 4 then forwards the response to the merchant's system where it is interpreted and a relevant response then relayed back to the cardholder and the merchant. Subsequent clearing and settlement are handled in a conventional manner, and involves the acquiring bank 5 depositing the total of the approved funds in to the merchant's nominated account. It will be appreciated that the communications associated with the settlement part of the process may be effected by either single or dual message implementations.

Whilst the foregoing example describes operation of the payment system 1 in relation to a single payment authorization request emanating from the trusted intermediary system 4, the system 1 can also be used for a plurality of payment authorization requests. The trusted intermediary system 4 could conduct a consolidated account identification procedure, which includes redirecting the user U1 to the identified issuing bank so as to perform a single afore-described account identification request procedure for all subsequent payment authorization messaging with the acquiring bank 5 processor. The user U1 would perform the account identification request procedure prior to the generation of each of said payment authorization requests and sending of same to the acquiring bank 5 processor. Alternatively the trusted intermediary system 4 could redirect the user to conduct individual account identification procedures, one for each payment authorization request.

Figure 2:
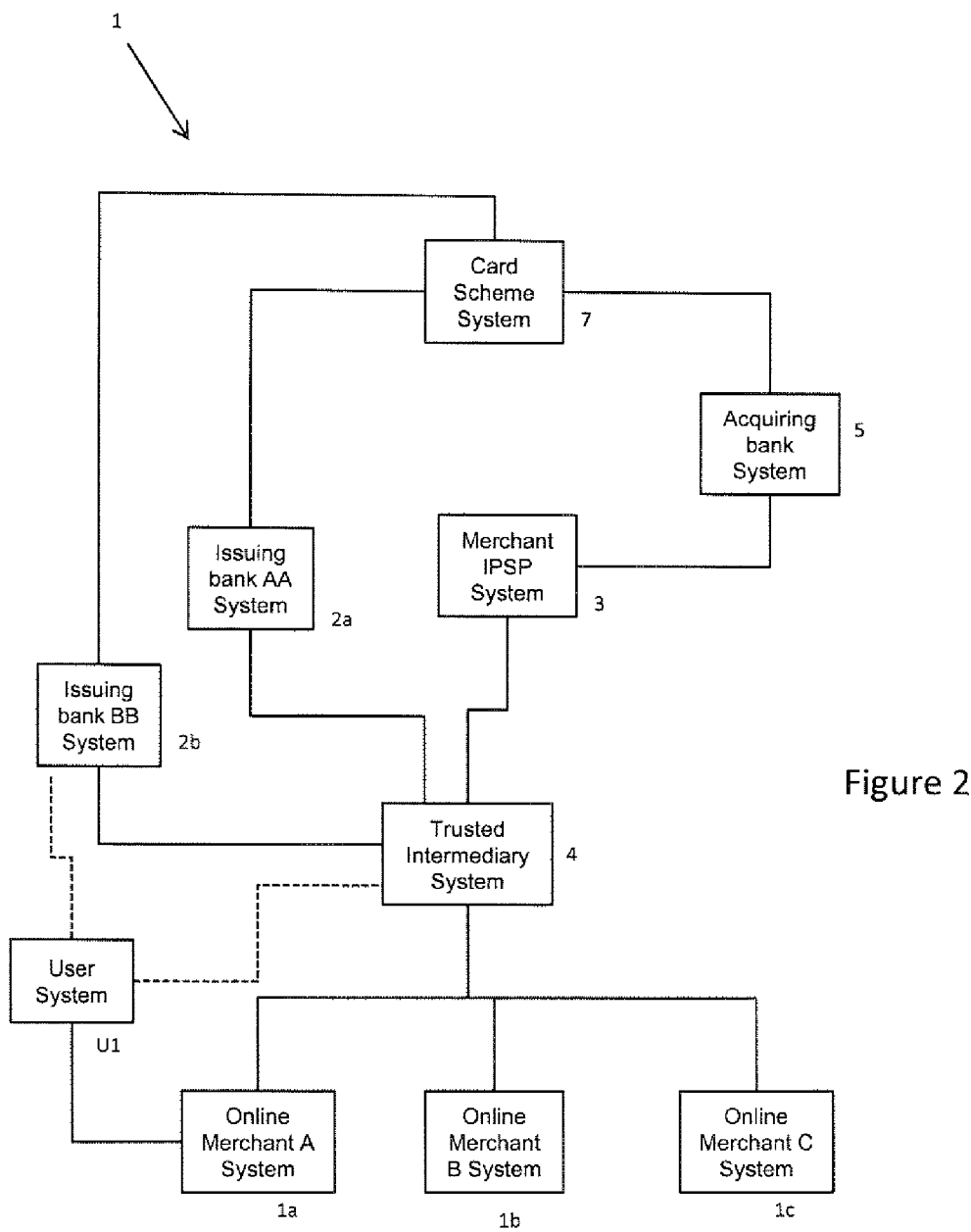
FIG. 2 is a schematic diagram showing a payment system according to a second embodiment of the invention.

FIG. 2 shows an alternative embodiment of the payment system, in which the system 1 comprises a merchant Internet Payment Service Provider (merchant IPSP system), which is a payment gateway selected by the merchant for the purposes of conducting secure business on the Internet. A merchant IPSP system 3 provides a system that passes card data, authorization requests, and authorization responses over the Internet using encryption technology. The transaction information is sent from the issuing bank 2b to the card scheme system 7 where the validity of the card is checked and the availability of funds on that account is verified. An authorization code is returned to the acquiring system 5 and on to the merchant IPSP system 3; the authorization is encrypted by the merchant IPSP system 3 and transmitted in encrypted form to the trusted intermediary system 4, which sends a suitable response to the web server of the merchant 1a, this triggering fulfilment of the order. Thus in this embodiment the trusted intermediary system 4 is involved in transmission of the account identification response to the processor of the acquiring bank 5.

Figure 3:
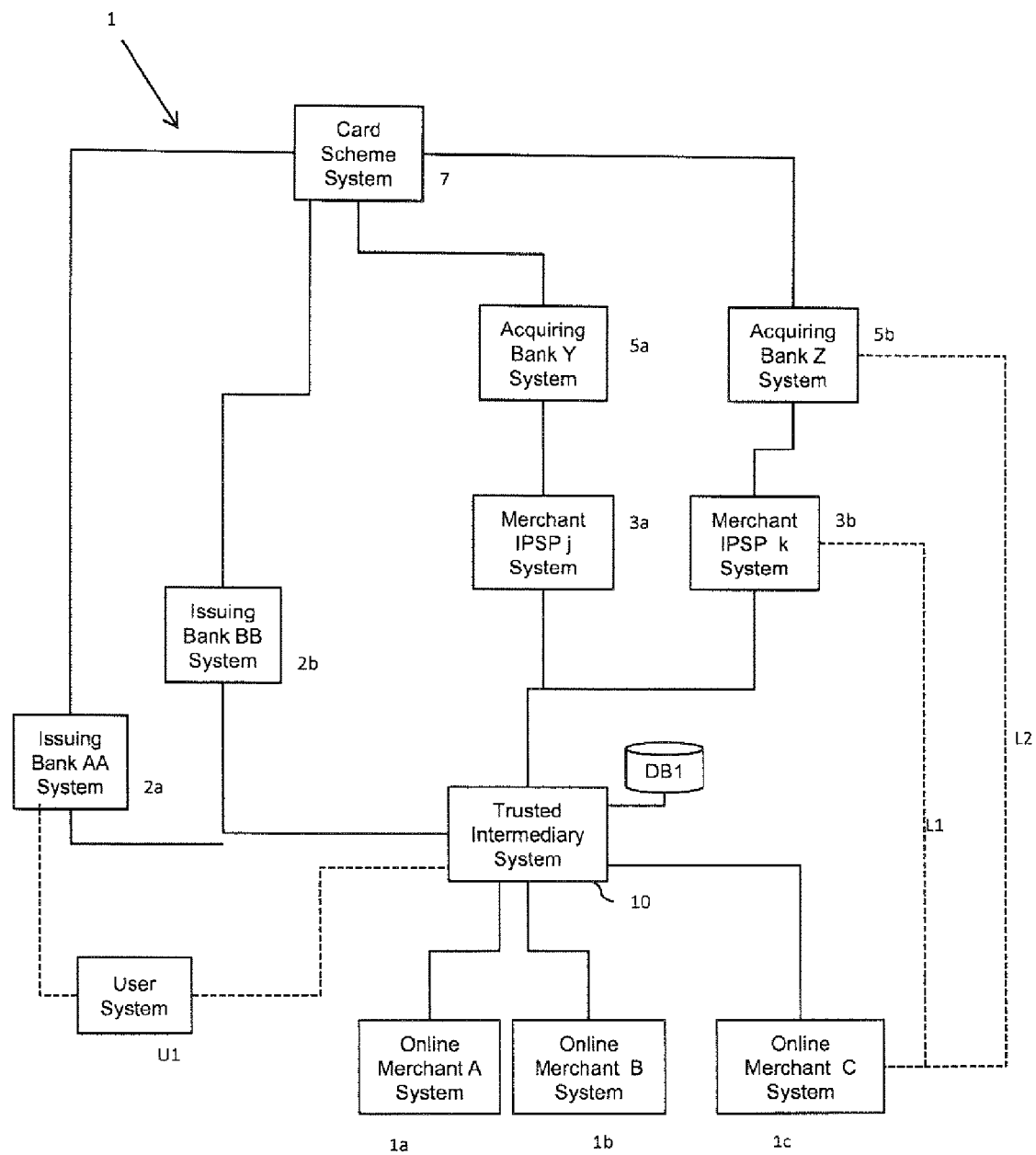
FIG. 3 is a schematic diagram showing a payment system according to a yet further embodiment of the invention.

In a preferred embodiment, the trusted intermediary system 4 is embodied within a novel transactional entity, herein referred to as a trusted intermediary, which cooperates with other payment entities of the payment system 1 as will now be described with reference to FIG. 3. The trusted intermediary 10 is shown as transmitting payment authorization requests to each of a plurality of different merchant IPSP systems 3a, 3b. Each of the online merchant processing systems 1a . . . 1c is associated with one of the merchant IPSP systems 3a, 3b, as indicated by the dotted line L1 for one of the merchants 1c, as well as being associated with one of the acquiring banks 5b, as indicated by the dotted line L2, again for merchant 1c. At least some of the merchant IPSP systems 3a, 3b can be configured to transmit payment authorization requests to more than one acquiring bank: this reflects the fact that more than one merchant may process their payments via a given merchant IPSP system, but each has an account with a different acquiring bank. Further each merchant online processing system 1a . . . 1c has been modified to include, as payment option, "Pay from Current Account" (PCA), this identifying a payment request via the trusted intermediary system 4.

The trusted intermediary 10 holds data in a database DB1 corresponding to merchants and issuing banks that have registered with the trusted intermediary 10, together with transaction data. Since the trusted intermediary 10 interfaces with, rather than replaces, the merchant's existing merchant IPSP systems, it is the merchant account identifier that is transmitted to the acquiring bank 5b. Thus the relationship for such transactions is between the buyer and the online merchant, with the resulting benefit that the buyer is protected by the card scheme's rules and by any applicable consumer protection. In addition, the merchant IPSP system can provide one or more additional various transaction processing functions, for example settlement, handling of chargeback, handling of refunds, and transaction reporting, on behalf of the online merchant system. In particular the merchant IPSP system may provide an online merchant with a secure online website whereby to approve chargebacks, initiate refunds and/or view transaction reports relating to transactions authorized through the system of the present invention. In addition, because payment systems according to embodiments of the invention involve the addition of the trusted intermediary 10 within an existing and known set of processing entities, payments can be made according to conventional methods using arrangements of the first and second types described in the background section in addition, or as an alternative to, via the trusted intermediary 10.

Figure 4:
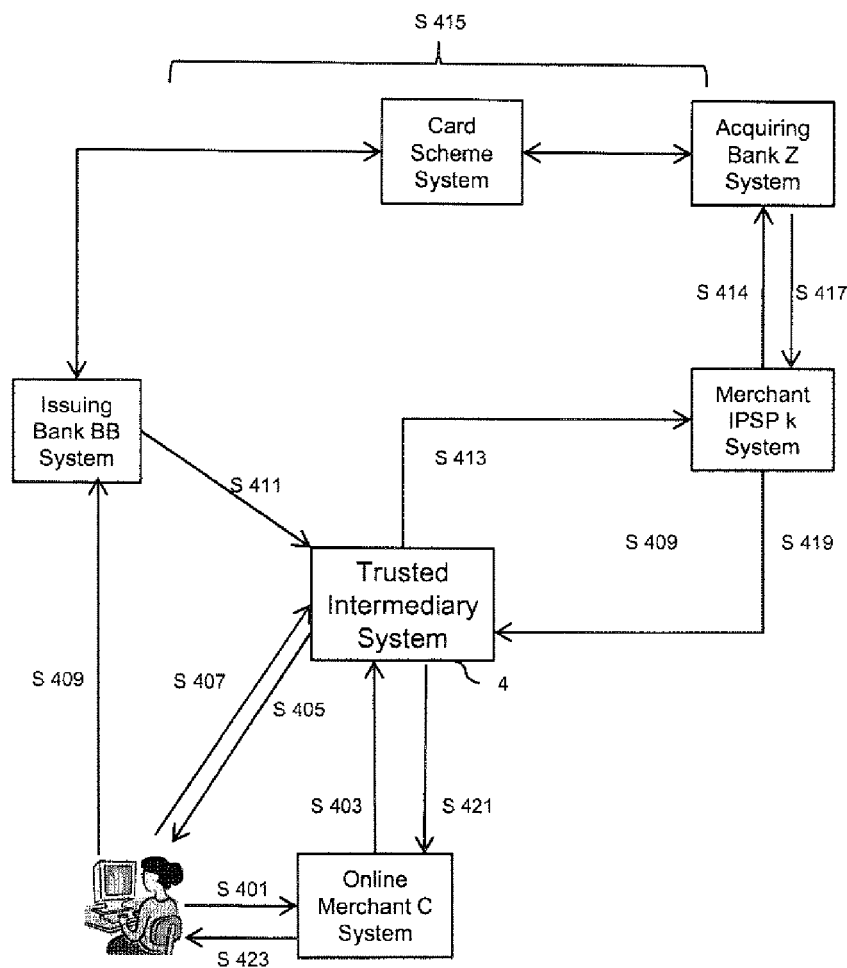
FIG. 4 is a schematic flow diagram showing the flow of data during use of the payment system of FIG. 3 according to an embodiment of the invention.

Referring now to FIG. 4, operation of the payment system 1 according to an embodiment of the invention will now be described. At step S401 the user completes their shopping experience with Merchant C's online merchant system, initiates checkout using the merchant system, and proceeds to the virtual checkout, according to conventional methods available through commonly available shopping cart and check-out software packages such as are known to the skilled person. The user selects "Pay from Current Account" (PCA) as a payment option (step S401), causing the merchant processing system 1c to transmit a request message to the trusted intermediary system 4 (step S403); the request message comprises at least an amount of payment for the selected goods, the merchant account identifier and an identifier for the order. The trusted intermediary 10 then transmits a login URL to the consumer (step S405), prompting the user to commence the account selection process: the user is presented with a selection page, into which the user enters the name and country code of the issuing bank they wish to use for this transaction, in the manner described above with reference to FIG. 1 (step S407). The trusted intermediary system 4 then performs a lookup to obtain the URL of the relevant issuing bank and sends a redirection instruction to the user's browser, causing the user's browser to be redirected to the online login page corresponding to their identified issuing bank (step S409). The user U1 logs on using their online banking credentials (such as customer number, password, memorable personal data etc.), causing the issuing bank software to send a list of eligible payment accounts and corresponding debit card details for selection by the user U1 (step S411). As described above, the account and card details include the PAN for each respective account.

Upon selection of the desired account the trusted intermediary 10 sends an authorization request message to the merchant's merchant IPSP system 3b, the request message comprising the selected account details, the amount of payment required and the merchant identifier (step S413). The merchant IPSP system 3b sends an authorization request to the relevant acquiring bank 5b (step S414), prompting authorization (or otherwise) per conventional methods (step S415) and the transmission of a response message from the acquiring bank 5b to the merchant IPSP system 3b (step S417). Assuming the response to comprise confirmation of the payment having been authorized, at step S419, the merchant IPSP system 3b sends a payment success notification message to the trusted intermediary 10. This payment success notification message comprises a reference for the card scheme authorization and a transaction identifier for the card scheme transaction.

Thereafter the trusted intermediary 10 sends a payment success confirmation message to the merchant system 1c (step S421), which prompts the merchant system to confirm the order status to the user (step S423).

It will be appreciated from the foregoing that conventional merchant systems (including their merchant IPSP system) require modifying to include "Pay from Current Account" (PCA) as a payment option and indeed to interface with the trusted intermediary 10. Accordingly the merchant IPSP system exposes a payment authorization service to the trusted intermediary 10 that allows payment and settlement for payment instruments (typically cards and bank accounts). Further it will be appreciated that because the trusted intermediary 10 integrates with many merchant IPSP systems, it thus comprises a plurality of interface formats and protocols, each corresponding to a respective merchant IPSP system. Further, each merchant's system is configured with integration software components, e.g. in the form of plug-ins, which enables the merchant to integrate with the trusted intermediary 10 for the purpose of initiating a payment transaction using PCA as a payment method.

Details of the configuration and processing capabilities of the trusted intermediary system 4, referred to herein as PCA, will now be described with reference to FIG. 5a. Thereafter, details of the trusted intermediary 10, referred to as "Secure System for Payment" (SSP) and in which the trusted intermediary system 4 is most conveniently implemented, will be described with reference to FIG. 5b.

The trusted intermediary system 4 comprises presentation and connectivity processing components, which are configured to transmit and manage various bank- and merchant-specific data; these processing components will be explained in more detail below, but in overview they comprise the following:

Bank Data Store:

The trusted intermediary system 4 stores bank identifiers, for example in the form of Bank Identification Codes (BICs), or country, branch and bank names, for those issuing banks that have signed up to the "Pay from Current Account" (PCA) service. For each listed issuing bank, the database DB1 also holds data identifying a URL corresponding to their online banking sign-on page.

Merchant Data Store:

The trusted intermediary system 4 stores merchant profile and registration data. These data include a merchant account identifier together with a transactional and network identifier of the merchant IPSP system 3b with which the merchant system is registered. These data are held to enable the trusted intermediary system 4 to communicate with the merchant IPSP system 3b on behalf of the merchant system in the manner described above, and are collectively referred to as merchant IPSP system transmission data, or simply transmission data. In addition the trusted intermediary system 4 comprises a payment authorization service through which the trusted intermediary system 4 effects payments on behalf of the merchant. Further, because the trusted intermediary system 4 integrates with many merchant IPSP systems, it comprises a plurality of interface formats and protocols. Details of the relevant formats and protocols for each merchant IPSPS system are held in the merchant data store. Thus the aforementioned transmission data comprises a mapping of a payment authorization request emanating from a given online merchant system to an IPSP identifier, a network address and/or network protocols that enable payment authorization requests to be routed to the relevant merchant IPSP system.

It will therefore be appreciated that registration of any given merchant offering the SSP service involves the merchant specifying the merchant IPSP system to which they subscribe. Conveniently the trusted intermediary system 4 can hold a set of records corresponding to active merchant IPSP systems: each set of records can comprise network identifier and required communications protocols for storage in the database DB1 by the trusted intermediary system 4. Thus during registration with the SSP the given online merchant can select, e.g. via a drop down list coordinated by the presentation components 504 of the trusted intermediary system 4, the merchant IPSP system to which the online merchant has subscribed; the corresponding transmission data (or a link thereto) can then be stored in conjunction with the merchant records held in the database DB1. Accordingly, provided the given online merchant has specified its corresponding merchant IPSP system in the manner just described, then in response to receipt of a payment authorization request from the merchant system, the trusted intermediary system 4 can perform a suitable lookup from the database and retrieve the corresponding network identifier, protocol requirements etc. of the corresponding merchant IPSP system.

Application Programming Interfaces (API) Services Adaptor:

The trusted intermediary system 4 comprises an API Services Adaptor, which enables connectivity between the trusted intermediary system 4 and the messaging infrastructure of the payment system 1. The adaptor is configured to manage the fulfillment of the trusted intermediary system 4 requests to external services, such as payment authorizations to merchant IPSP system 3*b* and to expose a set of the trusted intermediary system 4 services that could be used by external functions such as merchant IPSP system 3*b*.

Transaction-specific Components and Data:

The trusted intermediary system 4 stores transactional data such as payment authorizations and settlements that are managed by the trusted intermediary system 4. In addition the trusted intermediary system 4 can store audit data associated with merchant online activity as well as general system activity.

It will be noted that the afore-mentioned components do not include means for storing user-specific data; this is because the user specifies the payment method in real time (i.e. at the point of effecting a transaction) and because the user is authenticated for the payment service by their online bank. Thus the trusted intermediary system 4 does not need to hold user specific data. However, this is to be understood to be an optional aspect of the invention: the trusted intermediary system 4 could, and in fact in some embodiments (such as those described below with reference to FIG. 11) is required to, store user credentials. Indeed when a user opts to make use of the full functionality provided by the trusted intermediary 10, user data will be received and held thereby. The associated functionality provided by the trusted intermediary 10 is described below with reference to FIG. 5*b*.

Figure 5A:
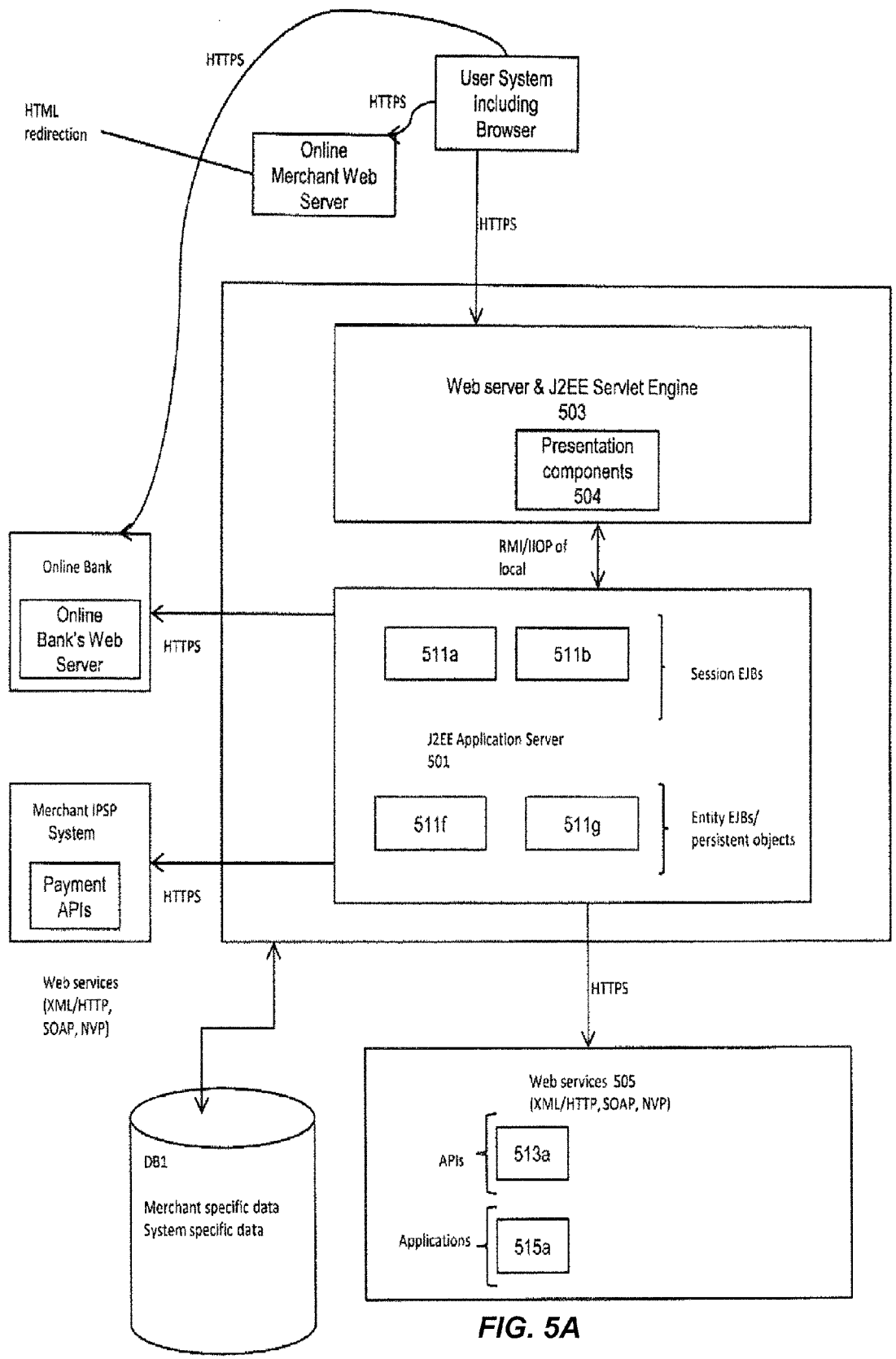
FIG. 5a is a schematic block diagram showing components of the trusted intermediary system according to an embodiment of the invention.

Remaining with the arrangement shown in FIG. 5*a*, and as mentioned above, the trusted intermediary system 4 is preferably embodied as a web application server, for example as a J2EE compliant application server 501 which manages and provides access to the common business logic of the platform, and a web server & J2EE servlet engine 503, which acts as the entry point for external HTTP requests to the trusted intermediary system 4 from merchants and from users' browsers.

The web server and servlet engine 503 comprises presentation components, which expose web services-based payment APIs or API wrappers to merchant systems. In addition, the web server and servlet engine 503 comprises presentation processing components 504 which are configured to generate and manage the interface to the user, e.g. when the user selects a payment method in the manner described above.

The J2EE Application Server 501 manages all the business logic for the web platform and applications. The business logic comprises functional software components 511*a*, 511*b*, which can be implemented as, for example, Session EJBs (Enterprise Java Beans). These functional groups include, e.g. payment services logic, and fraud and security service modules; in addition the server 501 comprises objects implemented as EJB 3.0 specified Java objects 511*f*, 511*g* that provide access to static and persistent data stored in DB1 such as audit data and transaction data described above. The trusted intermediary system 4 comprises web services in the form of wrappers that expose the Session EJBs to other elements of the payment system 1. More specifically, the functional software components 511*a*, 511*b* and objects 511*f*, 511*g* interoperate with external service enablers 505 such as fraud services 515*a*, among others. The application server 501 components 511*a*, 511*b* communicate with the application components via a set of APIs, referred to generically as such in relation to part 513*a*. When implemented as a web server, data between the elements of the payment system 1 (i.e. those shown in FIGS. 3 and 4) and the trusted intermediary system 4 are transmitted using a secure mechanism, e.g. via the HTTP over Secure Socket Layer protocol (HTTPS).

In addition to coordinating account selection by the user U1 in the manner described above, and thus incorporating the trusted intermediary system 4, the trusted intermediary 10 includes functionality that enables the user U1 to select from a plurality of preconfigured accounts in addition, or as an alternative, to specifying a transactional account on a per transaction basis. Thus, and as will be described in more detail below, the database DB1 can hold a set of payment details for the user in the form of a stored set of records conveniently referred to as a remote store; users can add details of cards and accounts that they can select to make payment for a transaction, causing the trusted intermediary 10 to update the contents of the user's remote store. This enables the user to select a payment method on a per transaction basis, whilst removing the requirement for the user to provide payment details to individual merchants. Thus, provided merchants subscribe to the trusted intermediary 10, users only have to submit their respective payment details once, to a single entity. This has the benefit of reducing the risk of fraud that may be incurred in relation to conventional payment systems that require the user U1 to enter their card payment details via the merchant's system.

Figure 5B:
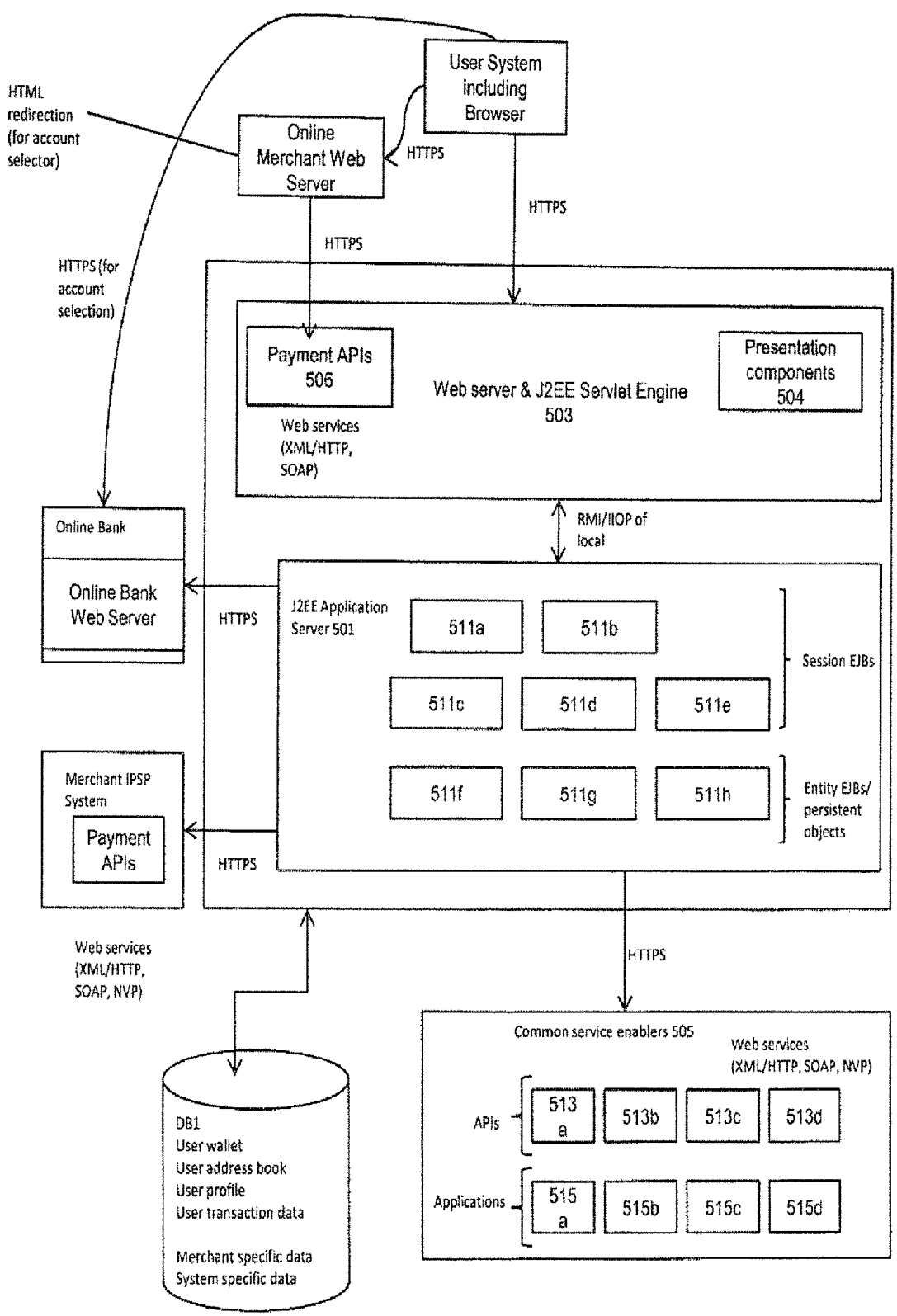
FIG. 5b is a schematic block diagram showing components of the trusted intermediary within which the trusted intermediary system according to an embodiment of the invention is implemented.

FIG. 5*b* is a schematic illustration of components of the trusted intermediary 10. Since, in this arrangement, the trusted intermediary system 4 is embodied within the trusted intermediary 10, and since the trusted intermediary system 4 is implemented using web server technology, the trusted intermediary 10 is also a web server. In addition to the components described above, the trusted intermediary system comprises the following elements:

User Registration Components and Data:

When a consumer wishes to make use of the pre-stored payment instrument facility offered by the trusted intermediary 10, they are required to complete an account registration process that allows a user to create a "Secure System for Payment" (SSP) account. The account is required to be populated with appropriate data that can be used to make payments via the SSP service from a merchant system offering the SSP service as a payment option.

Registration of the user with the trusted intermediary 10 can be performed via any suitable interface, most conveniently, when the trusted intermediary 10 is implemented as a web server, via a web browser. Once registered, each user has a profile associated therewith, which stores demographic and identification data for the user and can be modified via the presentation components 504, while user transaction data can be displayed for review by the user. In addition the user has address book entries, which hold shipping details; the presentation components 504 enable the user to modify the shipping details. As shown in FIG. 5*b* and explained in more detail below, in the case where the trusted intermediary 10 is implemented as a web server, the presentation components 504 interoperate with the user's browser to allow selection and modification of the user data in the manner just described.

Registration Can be Effected via a Number of Channels:

Via "Secure System for Payment" (SSP) site—the user logs onto the website of the trusted intermediary 10 and is presented with a registration page designed to capture the user's identity and preferred payment details Re-direct from checkout—If the user is within the merchant's online system and wishes to checkout using the "Secure System for Payment" (SSP) option they will need to register if they have not already done so. The consumer is re-directed to the registration screens associated with the trusted intermediary 10 and then re-directed back to the merchant's online system Register via online bank—assuming the trusted intermediary 10 comprises the necessary integration functionality, the user can register for the "Secure System for Payment" (S SP) service from within their bank's online account management.

User Authentication Components:

Authentication of a user into the "Secure System for Payment" service for payment transactions can be performed directly with the trusted intermediary 10 according to any one of the 3 known categories listed below, or via the user's online bank, in which case the user logs into their online banking account (using one of the three categories listed below), whereupon the banking system software re-directs the user back to the trusted intermediary 10.

1-factor authentication—Something the user knows (e.g., a username and password, pass phrase, or personal identification number (PIN))

2-factor authentication—As 1 factor authentication, plus, something the user has (e.g., ID card, security token, software token, phone, or cell phone)

3-factor authentication—As 2 factor authentication, plus, something the user is or does (e.g., fingerprint or retinal pattern, DNA sequence (there are assorted definitions of what is sufficient), signature or voice recognition, unique bio-electric signals, or another biometric identifier)

User Account Data:

As mentioned above, each user has a set of records e.g. in the form of a remote store associated therewith, which stores details of the payment instruments entered by the user and whose details they wish to store in a permanent manner for retrieval and access via the trusted intermediary 10. The trusted intermediary 10 comprises presentation components 504 that enable the user to select and add to/remove from the list of payment instruments.

Transaction-speciric Components and Data:

In addition to storing audit data associated with merchant online activity, the trusted intermediary 10 can store user activity data.

Messaging Services:

The trusted intermediary 10 is configured with email agents, which compose and transmit emails for the purposes of email address authentication and user activation and purchase order confirmations.

The web server and servlet engine 503 comprises presentation components, which expose web services-based payment APIs or API wrappers 506 to merchant systems.

In addition to the business logic components 511*a*, 511*b* described above, the J2EE Application Server 501 comprises functional software component such as, e.g. email processing modules, address validation modules 511*c* . . . 511*e*, while the static and persistent data stored in DB1 further includes user data. The functional software components 511*c* . . . 511*e* and object 511*h* interoperate with external service enablers 505 such as address validation services, email applications (including access to an email server) 515*b* . . . 515*d* in addition to the afore-mentioned fraud services 515*a*.

The processing steps described above with reference to FIG. 4, specifically the steps performed by the trusted intermediary system 4 to enable the user to select a transactional account, will now be described in more detail. Turning to FIG. 6, at step S6.1, the user selects "Payment from Current Account" (PCA) as the payment method and submits their selection to the merchant website. This triggers a request from the merchant system, specifically retrieval by the merchant system of the URL corresponding to the PCA service from the trusted intermediary 10. This results in the merchant website reloading its payment page with an iFrame, the content of which corresponds to the PCA URL, and subsequently the sending of a key order and the creation of a secure session (step S6.3). Having received the PCA URL from the trusted intermediary 10, the user U1 selects the Bank Identity Code (BIC) by inputting bank identifiers such as country, bank and branch (step S6.5). The selection is then forwarded to the trusted intermediary system web application 501 (step S6.7), triggering the application 501 to check that the selected bank is a participant of the PCA service (step S6.9). Assuming this to be the case, the trusted intermediary system 4 retrieves the URL of the bank's sign-in page from the data stored in the database DB1 and sends this to the iFrame (step S6.11), causing the user's browser to direct the user to their online banking web page (step S6.13). It is to be noted that the user logging onto their online banking account serves to authenticate them to the trusted intermediary system 4—i.e. there is no need for a second authentication process with the intermediate payment processing entity 10.

The user U1 then enters their online banking details (step S6.13); assuming sign in to be successful, the bank software activates a self-expiring token (step S6.15). The token can be used for any API calls as proof of authentication, and accordingly is returned to the iFrame, together with an instruction to redirect the iFrame back to the trusted intermediary system 4 (step S6.17). The redirection instruction triggers a request message to be sent to the trusted intermediary system 4 application, instructing the trusted intermediary system 4 application to request a list of accounts for the user (step S6.19) from the banking software. Accordingly an API call to the online banking software is made to obtain the list of accounts and PANs, using the authentication token transmitted to the trusted intermediary system 4 at step S6.17 (step S6.21). Thereafter, a list of accounts is sent to the trusted intermediary system 4 application (step S6.23), which generates an account selection page for display to the user (step S6.25), enabling the user to select an account and submit their selection to the trusted intermediary system 4 application (step S6.27). The trusted intermediary system application 501 then forwards the account selection to the issuing bank software, again using the bank token (step S6.29), together with a request for the account identifier corresponding to the selected account. In response the bank software returns the PAN number normally associated with the debit card linked to the user's account to the trusted intermediary system 4 application (step S6.31)

Having received the PAN, the web server and servlet engine 503 sends the payment details to the merchant's merchant IPSP system 3b via a payment authorization service through which the trusted intermediary 10 effects submission of a payment demand on behalf of the merchant; this involves creating an authorization request for receipt by the payment APIs 506, converting the payment authorization request into the API format of the merchant's API and transmitting the formatted request to the merchant IPSP system 3b. A settlement request is also transmitted to the payment APIs 506, which performs conversion of the settlement request into the API format of the merchant's API and transmits same to the merchant IPSP system 3b. It will be appreciated that the communication may be effected by either single or dual message implementations. These formatting and transmission actions are recorded in the transaction data store held by the trusted intermediary 10 corresponding to the merchant system.

Upon notification of authorization of the payment request, the web server and servlet engine 503 transmits a return merchant URL to the iFrame, together with notification of successful authorization, causing the iFrame to empty, reload with JavaScript code from the merchant system, and thus remove the iFrame and return the user to the merchant's website. Finally, the merchant displays the successful payment page.

Figure 6:
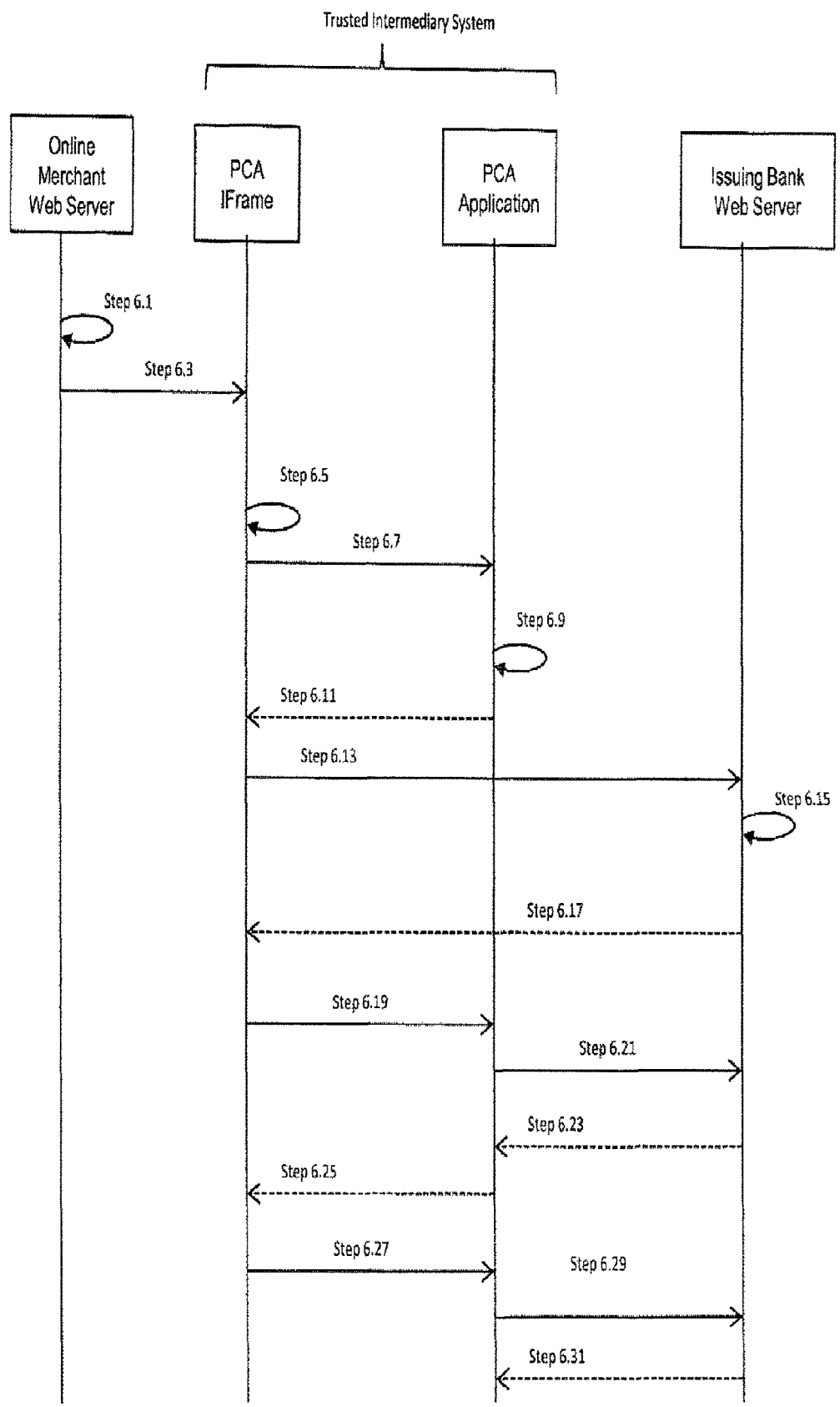
FIG. 6 is a schematic timing diagram showing the flow of messages associated with account selection according to an embodiment of the invention.

The process shown in FIG. 6 is particularly advantageous in that the user is presented with their own bank branded sign-on page; in addition the bank carries sole responsibility for authenticating the user, and can therefore apply its own authentication methods and fields. Furthermore, because the bank software sends a token to the trusted intermediary system iFrame, and this is passed to the trusted intermediary system application 501, enabling the trusted intermediary system application to start a communication session with the issuing bank, the user is presented with a standardized interface for retrieving account identifiers and associated account identifiers from their bank.

In parallel with foregoing steps, the application server 501 can log the user's activity and send same to the audit data store, while sending corresponding system and event information to a third party fraud notification system (this is represented by one of the common service enablers 515a shown in FIG. 4). The fraud notification system comprises, but is not limited to, a fraud risk engine, which performs analysis of same so as to generate a risk score and a recommended action for the transaction; suitable fraud notification systems such as that provided by RSA™ in their fraud prevention suite are known and will not be described in any more detail herein.

The risk score and action are stored in the database DB1, in conjunction with the other transaction details for the merchant and the user.

Figure 7:
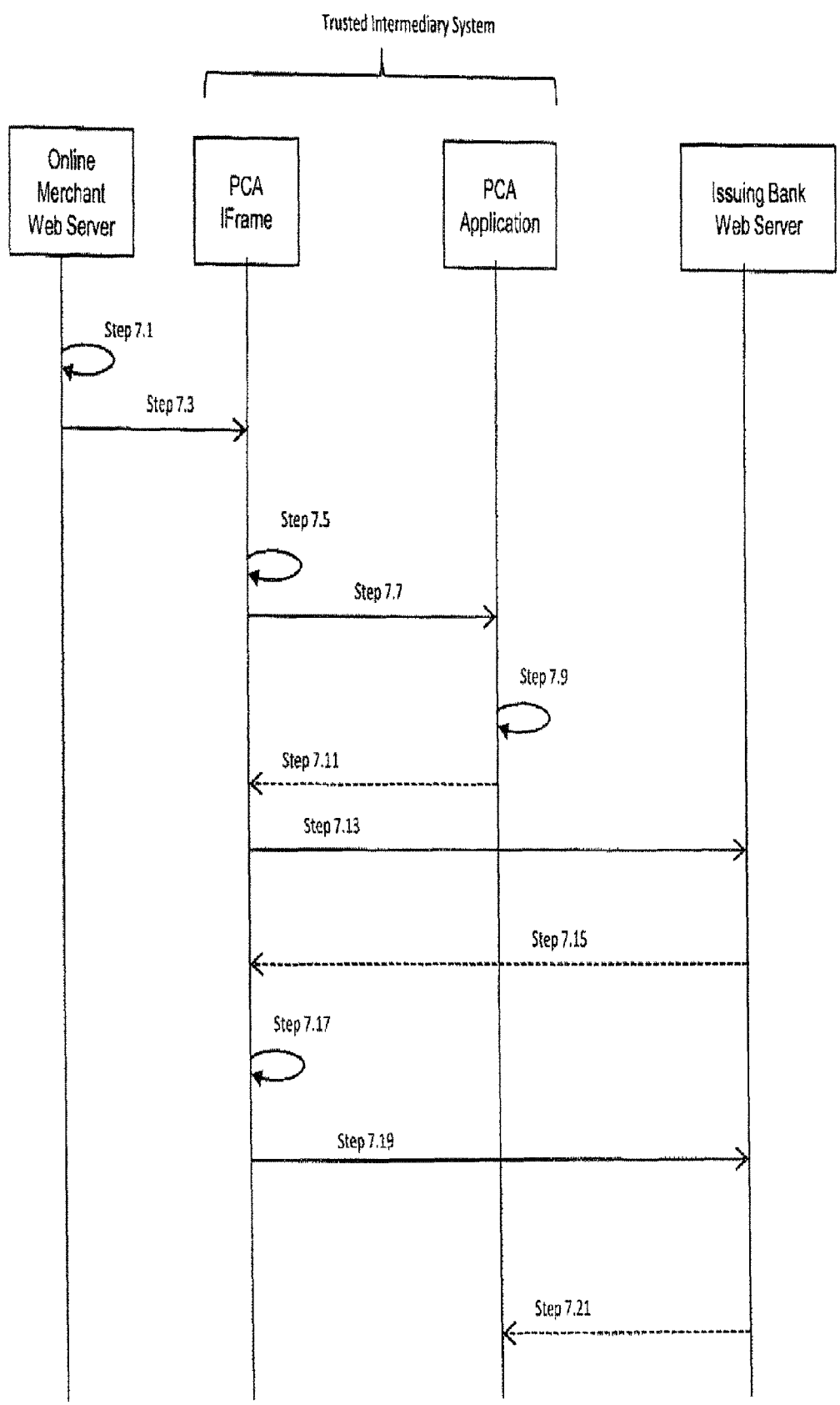

Alternative methods for enabling the user to select an account from their issuing bank are envisaged: examples of such alternative methods are shown in FIGS. 7-10. FIG. 7 differs from the embodiment shown in FIG. 6 in that the issuing bank sends an account selection URL in response to the user having submitted their sign-on details, causing rendering of the user's accounts under direct control of the banking software rather than via an API offered by the banking software. Thus steps 7.1-7.13 proceed per steps 6.1-6.13, then at step 7.15 the banking software sends an account selection URL to the iFrame of the trusted intermediary system loaded in the merchant's website. Once displayed, the user can select an account from those listed (step 7.17), whereupon the selected account is submitted to the banking software (step 7.19) and the PAN number corresponding to the selected account is transmitted to the trusted intermediary system application (step 7.21).

Figure 8:
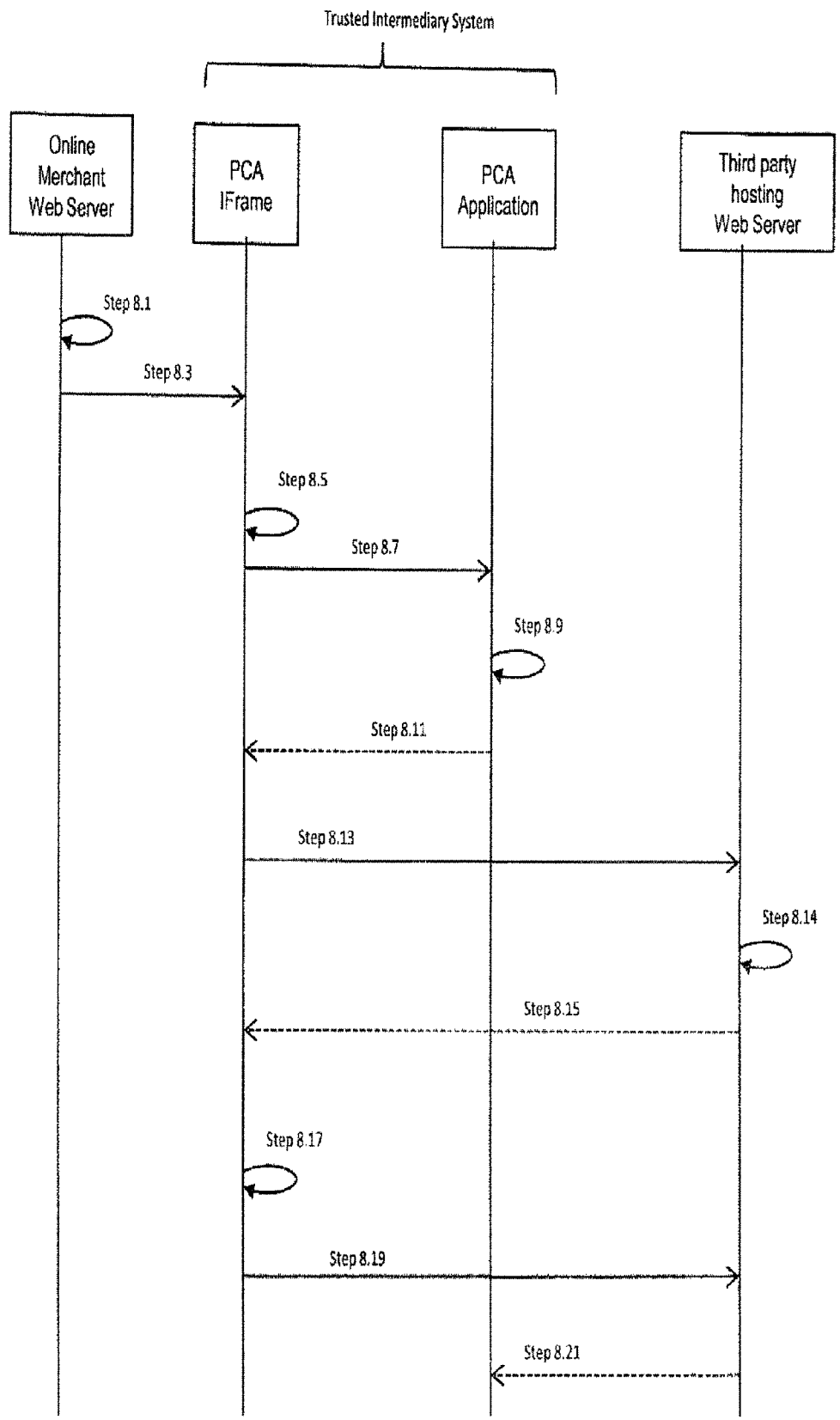

FIG. 8 shows an arrangement in which the interactions between the trusted intermediary system 4 and the issuing bank have been passed to a third party such as RSA™ or Arcot™: the third party provides the services on behalf of issuing banks. Steps 8.1-8.9 proceed as per steps 6.1-6.9; at step 8.11 the trusted intermediary system 4 identifies the banks sign on URL as hosted by the third party from its configuration data, and displays this in the iFrame. The user subsequently inputs their sign in details, which are transmitted to the third party (step 8.13). In response, the third part hosting service creates a self expiring token for any subsequent API calls (step 8.14) and sends an account selection URL to the iFrame for display to the user on the merchant's website. Steps 8.15-8.21 proceed as described with reference to steps 7.15-7.21 of FIG. 7.

Figure 9:
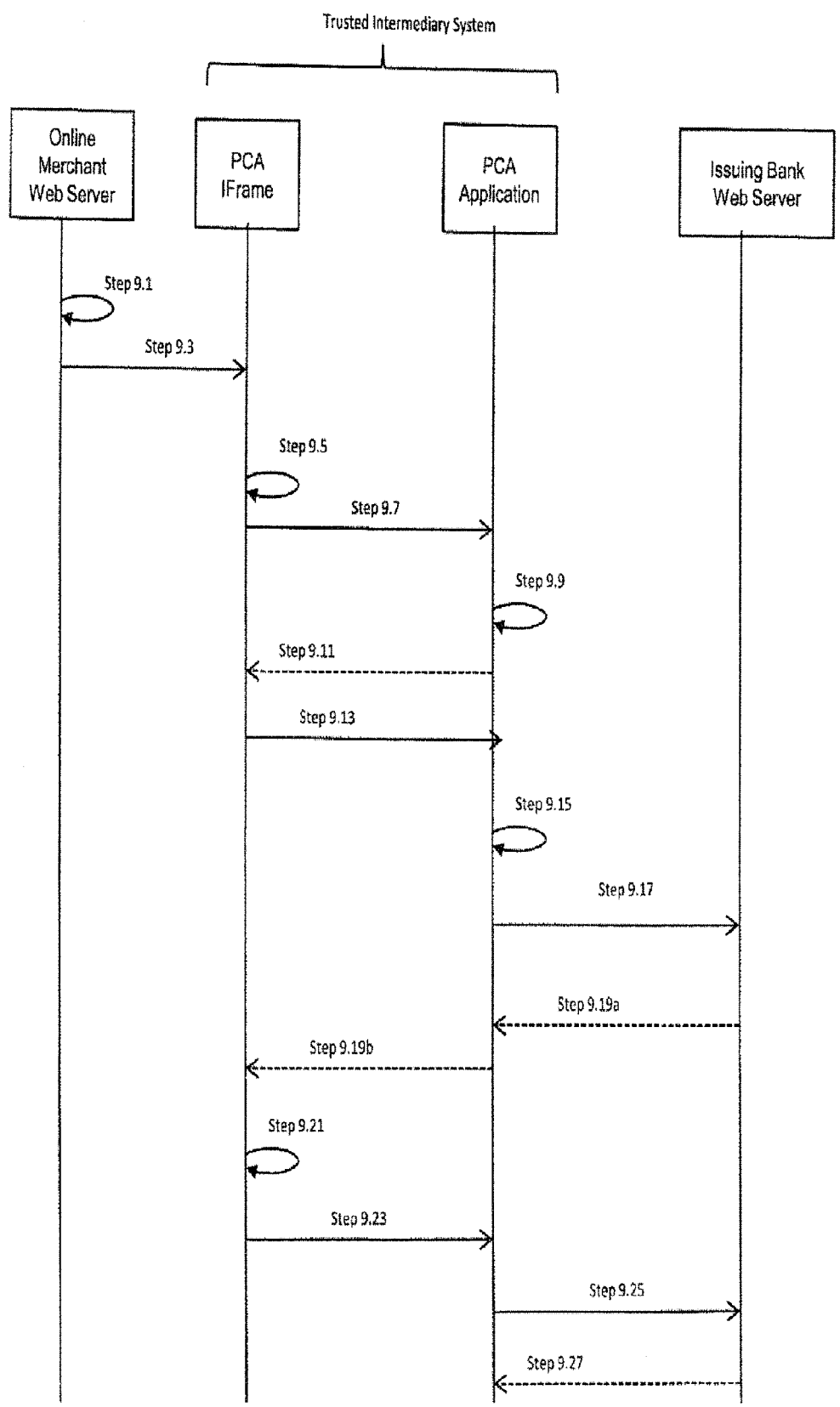

FIG. 9 shows an arrangement in which the user provides their online banking details to the trusted intermediary system 4, which subsequently uses the sign on information to automatically log onto the issuing bank and thence retrieve the list of accounts. In this arrangement the trusted intermediary system application 503 acts as a mediator between the online merchant system and the issuing bank. Steps 9.1-9.11 proceed as described with reference to FIG. 6, but at step 9.13 the sign in details are sent to the trusted intermediary system application 503, which retrieves the bank sign-in URL, populates same with the user's sign in details received at step 9.13, and performs the sign in to the online banking software on behalf of the user (steps 9.15, 9.17). The account numbers are then transmitted to the trusted intermediary system application 503 (step 9.19a), which forwards same to the iFrame together with notification of successful login (step 9.19b). The account selection page is displayed in the iFrame (step 9.21) and the user's account selection is forwarded to the trusted intermediary system application 503 for onward transmission to the issuing bank web server (steps 9.23, 9.25). Finally the PAN is sent from the issuing web server to the trusted intermediary system application 503 (step 9.27).

Figure 10:
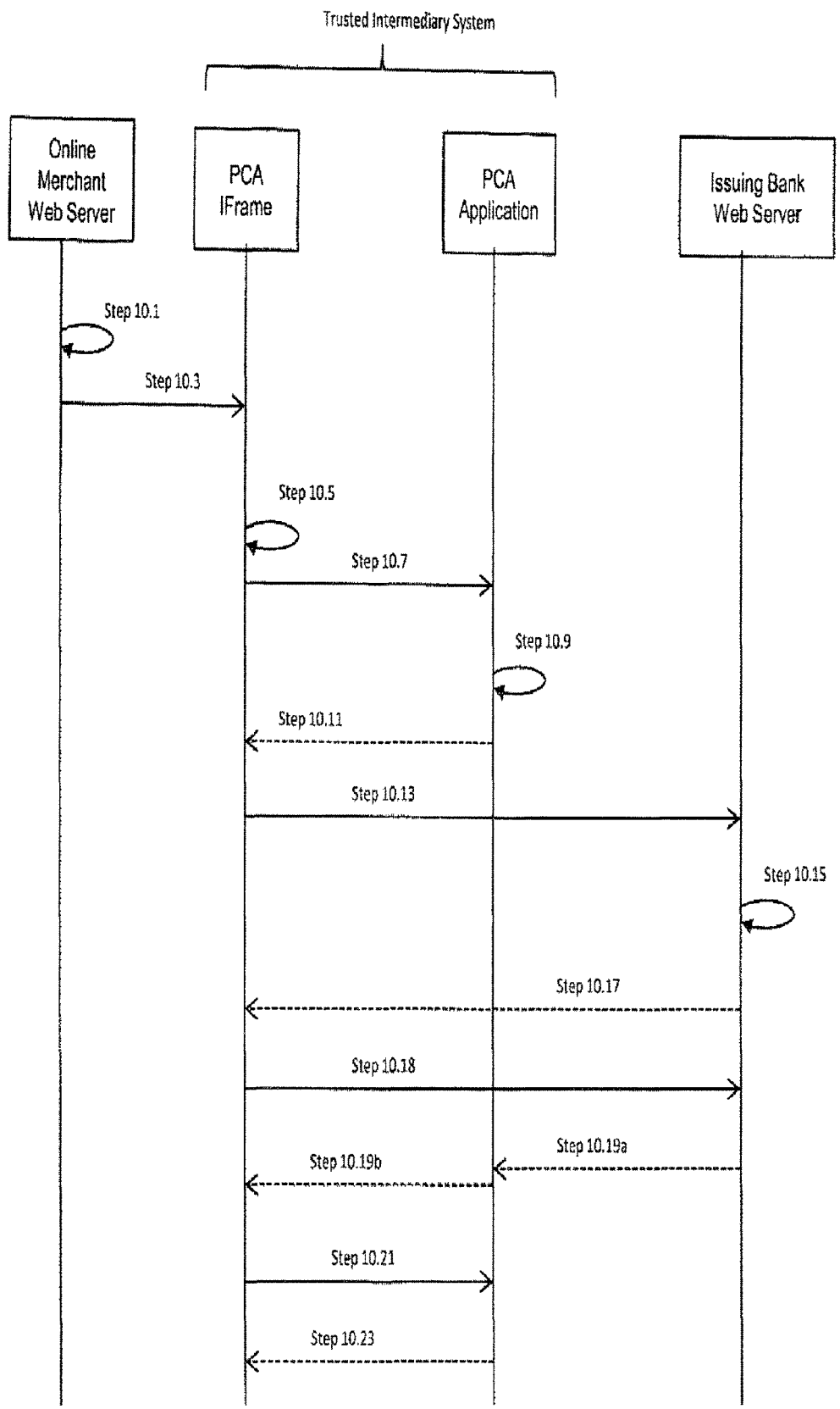

FIG. 10 shows an arrangement in which an API is used by the trusted intermediary system application 503 to retrieve the list of accounts from the banking software. As for the FIG. 9 embodiment, the user is required to first select their bank, whereupon the trusted intermediary system application 503 provides a sign-on page for the user to enter their online banking sign on details. A call is then made to the issuing bank to retrieve the list of accounts for the sign on information provided by the user. In more detail, steps 10.1-10.13 proceed as described with reference to FIG. 6, then at step 10.15, and in response to receipt of the user's sign-on details, the issuing bank software generates an authentication token, which is subsequently transmitted to the iFrame of the trusted intermediary system 4 (step 10.17). In response, the trusted intermediary system 4 sends a request for a list of accounts corresponding to the user (authenticated at step 10.15), the request being accompanied by the authentication token. Assuming the authentication token to match that generated at step 10.15, the account list is sent to the intermediary system application 503 (step 10.19a), which temporarily stores the accounts (including account identifiers) and coordinates display thereof in the iFrame at the merchant's online system (10. 19b). Thus when the user selects an account from the list (step 10.21), this results in the intermediary system application 503 identifying the corresponding PAN from the numbers stored in its own local and temporary storage.

As a further alternative, the user could be authenticated by the trusted intermediary 10 and delegate the responsibility to the trusted intermediary 10 to effect a log onto the user's selected bank account. Logon could be performed on the basis of a suitable set of credentials supplied by the user, such as a credit card number and/or expiry date, which the user could enter in real time or select from their stored card details, and which forms the basis of authentication of the user by the selected issuing bank.

Figure 11:
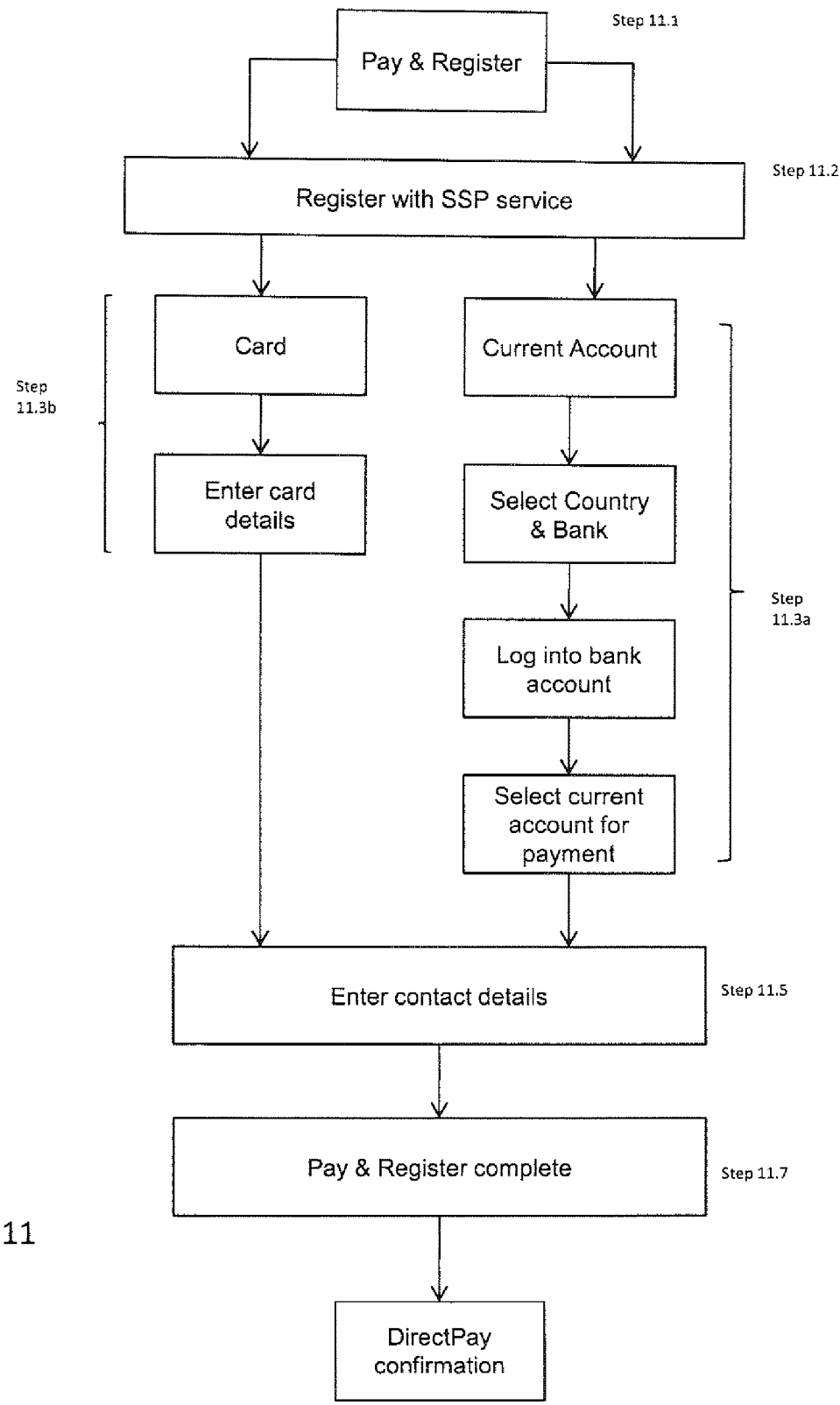
FIG. 11 is a schematic flow diagram showing alternative, end-to-end, payment selection paths, which employ a further embodiment of the invention.

FIG. 11 is a generic flow diagram showing the steps involved in effecting payment using a payment instrument selected according to an embodiment of the invention under control of the "Secure System for Payment" (SSP) service: at step S11.1 the user selects the "pay and register" option from the merchant's online shopping software, whereupon the user is first required to create a SSP account by providing personal information such as name, email address, a password, contact telephone number any possibly delivery address (step S11.2). These details are saved into the database, and the user is then presented with two options: either to pay by card or to pay from a current account. The branch labelled step 11.3a corresponds generically to the process steps described with reference to FIGS. 1-5a, 6-10, while step 11.3b corresponds to the user selecting the option of entering and storing details of a card to be used for the transaction. This latter alternative therefore makes use of the functionality of the trusted intermediary 10 described with reference to FIG. 5b, with the presentation components 504 providing the user with an interface for entering card details and thence storing same in the database DB1. Irrespective of the payment option selected the user is then prompted to verify that all their transaction details are correct, or to add/edit them by for example providing an alternative delivery address. The user can then finalise the transaction. Once the payment selection process has been completed, the trusted intermediary 10 proceeds with the transaction as described, e.g. with reference to steps S413-S421 of FIG. 4, finishing the process with transmittal of a confirmation message to the online merchant.

From the foregoing it will be appreciated that embodiments of the invention can be viewed as comprising several parts, namely a) invocation; b) authentication; c) account selection; and d) payment routing. As regards part a), the "Payment from Current Account" (PCA) option can be invoked either directly from the online merchant's website, as described with reference to FIGS. 1-8, or via the "Secure System for Payment" service (SSP), as described with reference to FIG. 11.

In relation to authentication of the user's request to select an account for payment, this can be performed under control of the selected issuing bank, using information held by the user's bank (FIGS. 1-8), or under control of the trusted intermediary 10, which can optionally involve a registration process (FIG. 11). In either case it will appreciated that there is no requirement for registration as such with the trusted intermediary, since the user is effectively authenticated upon successful logging into their online bank account.

In relation to selection of an account for payment, a user may have a plurality of accounts within a given issuing bank and indeed may have accounts with a plurality of issuing banks. Thus the interface presented to the user, whether it is direct from the online merchant's system, or via the SSP service, is such that the user can identify their chosen issuing bank and indeed bank accounts therein. When authenticated by the issuing bank, the bank presents a list of accounts to the user, the user selects and sends the bank account details to the PCA service. When authenticated by the SSP service, the SSP service presents a list of accounts, based on previously saved data, for selection by the user.

Turning finally to payment routing, as described with reference to FIGS. 1-10, a transaction can be effected using the supplied PAN via the merchant IPSP system associated with the buyer. As an alternative, the transaction could be debited from the user's account and credited to the merchant account via a card scheme system or an acquiring bank system. As a further alternative, the transaction could be debited from the user's account via an alternative account key and credited to the merchant account via an alternative account key.

The above embodiments are to be understood as illustrative examples of the invention. Further embodiments of the invention are envisaged. For example, whilst in the foregoing examples the trusted intermediary 10 is described as receiving payment requests from online merchant systems, the trusted intermediary 10 could additionally or alternatively receive payment requests from a merchant IPSP system in an arrangement in which the merchant IPSP system is providing checkout services to the user. In such embodiments, such merchant IPSP systems are modified to offer "Secure System for Payment" (SSP) as an additional payment option.

Whilst in the above embodiments, the financial account identity is given in the form of a PAN, other financial account identities may be used in the alternative. For example, a user's International Bank Account Number (IBAN), or alternatively a bank identifier, which is preferably an international bank identifier such as country code and sort code, or BIC code, and an account number. However, a PAN format is preferred since it is in the format which is processed using existing card scheme payments.

Whilst in the above embodiments, a PAN permanently associated with a user's financial account is used, in the alternative, or in addition, an issuing bank system may provide, as account identifier responses, one-time-use PAN's which are generated for one-time use, and a large number of such one-time-use PAN's may be stored and mapped by the issuing bank system against a single financial account.

Further, in the above examples it is assumed that the starting point for the process is the online merchant's website; however embodiments of the invention could also be used in conjunction with effecting bill payments or other invoices, where the origin of the transaction would not be an online merchant system. Traditional bill-payment type scenarios assume a push-payment from the buyer (the user) to the beneficiary, typically through an Automated Clearing House (ACH), so the payment is initiated by the buyer's (the payer's) issuing bank. Whilst the transaction is initiated in this scenario from a starting point other than from a merchant system, the actual financial transaction is nevertheless entered in to the transaction processing environment by an agent of the merchant. Consequently, in financial terms it would be deemed a pull-payment; however, since the payment is initiated by the buyer (the payer), the user will perceive it as a push-payment.

Further, whilst preferred embodiments make use of iFrame web technology to navigate the user to different web sites, it will be appreciated that standard web redirection can instead be employed. In such alternative arrangements the user's browser will be navigated away from and back to the trusted intermediary system 4 web site, depending on the entity (or rather the URL corresponding thereto) with which the user's browser is communicating at any point in time. For example, during authentication and/or account selection by the user, the user's browser may be redirected by the SSP website to a website provided by, or on behalf of, the user's issuing bank, and once the user authentication and/or account selection is completed, the user's browser may be redirected by the issuer bank website back to the SSP website.

In the foregoing, the term "system", when applied to entities such as the merchant system, the merchant IPSP system, the trusted intermediary system, the account identification system and other entities, should be understood to mean a data processing function, provided at one or more physical sites, connected to other data processing functions via data communications links. Each function may be provided by a single data processing node, for example a server computer, or a set of data processing nodes providing fail-over backup to each other, such as a cluster of server computers, and/or a set of interconnected data processing nodes providing different modular sub-functions with respect to other members of the set, for example an interworking set of different server computers.

As will be appreciated from the foregoing, communications between the various entities comprising the payment system 1 proceed via a data communications network such as the Internet. Each of the entities of the payment system 1 (the issuing bank; the account identification system within the issuing bank, which is used to identify a current account from which payment is to be deducted; the trusted intermediary system; the trusted intermediary; the acquiring bank processor; the merchant IPSP systems; and the online merchant systems) is identifiable via a network identifier such as an Internet Protocol (IP) address or other suitable identifier.

Accordingly the communications network can comprise a fixed line network comprising one or more technologies i.e. a hybrid communication network; for example the network can comprise the Internet in conjunction with the Public Switched Telephone Network (PSTN) and/or a mobile communication network capable of supporting, for example, one or more of the following communication protocols: GSM (Global System Mobile), WCDMA (Wideband Code Division Multiple Access), GPRS (General Packet Radio Service). In addition to or instead of the mobile communication network, a local area network such as a Wireless Local area network (WLAN) or BlueTooth® (BT) and/or other technologies such as WiMax can be used to carry part of the request and response messages. In this way, users can interact with the online merchant systems using portable, remote devices. The data communications network can be configured to support generic Internet access using any transport methods. In addition, or as an alternative, to sending confirmation messages as email messages, payment confirmation messages can be transferred as SMS-messages (Short Message Service), MMS-messages (Multi Media Service), Wireless Application Protocol (WAP) pages, Internet pages, HTML (Hypertext Mark-up Language) pages, XHTML (eXtended HTML) pages, or IP-datagrams (Internet Protocol).

One of the embodiments described above relates to application of the invention in relation to a bank account that has a card associated therewith; others do not require the bank account to be associated with a payment product of any type, while others still may involve a bank account associated with a payment product such as a mobile phone or biometric information. Other applications are envisaged.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing payment authorization requests for payment transactions to be conducted via a data communications network, the payment authorization requests being conducted as a result of orders by financial account holders via a plurality of different online merchant systems,
wherein the financial account holders hold accounts with a plurality of different issuing banks,
the method comprising conducting an account identification procedure comprising:
identifying, from the plurality of different issuing banks, an issuing bank associated with a financial account holder;
on the basis of the identification of the issuing bank, retrieving issuing bank transmission data over a data communication network to enable the transmission of account identification request data, the issuing bank transmission data being dependent upon the identified issuing bank and identifying a selected account identification system associated with the identified issuing bank;
on the basis of the retrieved issuing bank transmission data, transmitting an account identification request over the data communication network to the selected account identification system associated with the identified issuing bank;
receiving over the data communication network from the account identification system associated with the identified issuing bank an account identification response in response to the account identification request, the account identification response identifying a financial account identity, the financial account identity including a Primary Account Number ("PAN") capable of being used in the authorization of at least one payment transactions, the at least one payment transaction being initiated as a result of a financial account holder conducting at least one order via at least one online merchant system; and
responsive to receiving the account identification response:
a) generating a payment authorization request comprising transaction data including:
i) said PAN to be used in a payment transaction by the financial account holder;
ii) a merchant identity, associated with a first online merchant, as the payment transaction beneficiary; and
iii) transaction detail including a payment amount; and
b) transmitting the generated payment authorization request for subsequent processing by an acquiring bank payment processor system responsible for processing payment authorizations for an acquiring bank with which the first online merchant is associated.

2. The method of claim 1, further comprising generating a plurality of payment authorization requests including the same financial account identity, and conducting a separate account identification procedure, which includes transmitting a the account identification request and receiving a the account identification response, prior to the generation of each of the payment authorization requests.

3. The method of claim 1, further comprising generating a plurality of payment authorization requests including the same financial account identity, and for each of the plurality of payment authorization requests, holding the financial account identity, such that only a single account identification procedure, which includes transmitting a the account identification request and receiving a the account identification response, is required for all of the plurality of payment authorization requests.

4. The method of claim 1, wherein the data communications network comprises a plurality of different merchant Internet Payment Service Provider (merchant IPSP system) systems,
- each of the merchant IPSP systems being configured to transmit payment authorization requests to at least one of a plurality of acquiring bank payment processor systems, each of the plurality of acquiring bank payment processor systems being responsible for processing payment authorizations for at least one acquiring bank, and
- each of a plurality of online merchants being associated with a different one of the plurality of merchant IPSP systems,
- wherein the method further comprises:
  - retrieving merchant IPSP system transmission data to enable the transmission of payment authorization request data to a selected merchant IPSP system associated with the first online merchant; and
  - on the basis of the retrieved merchant IPSP system transmission data, transmitting the generated payment authorization request to the selected merchant IPSP system, wherefrom a further payment authorization request may be generated and transmitted to an acquiring bank payment processor system responsible for processing payment authorizations for the acquiring bank with which the first online merchant is associated.

5. The method of claim 1, wherein the method further comprises receiving a merchant identity from the first online merchant system, the merchant identity included in the generated authorization request being generated on the basis of the received merchant identity.

6. The method of claim 1, wherein the method is conducted by a trusted intermediary system, the method comprising the trusted intermediary system receiving from online merchant systems, responsible for originating payment authorization requests for online merchants, payment authorization requests relating to authorization of payment transactions, the received payment authorization requests being initiated as a result of financial account holders conducting an order via the online merchant systems.

7. The method of claim 6, wherein the account identification procedure is conducted by the trusted intermediary system in response to receiving a said payment authorization request from an online merchant system.

8. The method of claim 6, wherein the trusted intermediary system is arranged to receive a payment authorization response, and in response thereto to transmit a payment authorization response to the first online merchant system.

9. The method of claim 4, wherein the method is conducted by a trusted intermediary system, the method comprising the trusted intermediary system receiving from online merchant systems, responsible for originating payment authorization requests for online merchants, payment authorization requests relating to authorization of payment transactions, the received payment authorization requests being initiated as a result of financial account holders conducting an order via the online merchant systems.

10. The method of claim 9, wherein the trusted intermediary system provides a registration interface for online merchants whereby the online merchants can register a merchant IPSP system with which they are associated, and wherein the step of retrieving transmission data to enable the transmission of payment authorization request data to the selected merchant IPSP system associated with the first online merchant is conducted on the basis of the merchant IPSP system registered by the first online merchant.

11. The method of claim 10, wherein the trusted intermediary system is configured to receive and process payment authorization requests for payment transactions of a first type originating from the first online merchant system, and in response thereto to transmit a generated payment authorization request to the selected merchant IPSP system, and wherein the merchant IPSP system is configured to receive and process payment authorization requests for payment transactions of a different type originating from the first online merchant system, the payment authorization requests for payment transactions of a different type not being processed via the trusted intermediary system.

12. The method of claim 1, wherein the method further comprises receiving data indicating a selection, by the financial account holder, between a plurality of different financial accounts for use in the payment transaction, and retrieving a financial account identity on the basis of the indicated selection.

13. The method of claim 12, further comprising providing an account selection interface for a financial account holder whereby the financial account holder can select a financial account identity.

14. The method of claim 1, further comprising authenticating a financial account holder and, in response thereto, retrieving a financial account identity.

15. The method of claim 1, wherein retrieving issuing bank transmission data comprises retrieving a network address for the selected account identification system.

16. The method of claim 15, comprising transmitting the retrieved network address to a financial account holder to enable the financial account holder to access the selected account identification system, whereby the financial account holder is able to conduct an identification procedure by providing identifying information to the selected account identification system.

17. The method of claim 16, comprising receiving the account identification response from the selected trusted intermediary system in response to authentication of the financial account holder by the selected account identification system.

18. The method of claim 1, wherein the PAN is associated with the financial account holder.

19. The method of claim 1, wherein the PAN comprises a payment card number.

20. A trusted intermediary system in communication with an online merchant systems and with a plurality of issuing banks, each having an account identification system associated therewith, the trusted intermediary system being configured to conduct the account identification procedure of the method of claim 1.

21. A merchant IPSP system in communication with a trusted intermediary system and a plurality of online merchant systems, the merchant IPSP system being configured to conduct the merchant IPSP system steps of the method of claim 4.

22. A transaction processing system for processing payment authorization requests for payment transactions to be conducted via a data communications network, the payment authorization requests being conducted as a result of orders executed by financial account holders via a plurality of different online merchant systems, wherein the financial account holders hold accounts with a plurality of different issuing banks, and the payment authorization processing system comprises an interface configured to enable communication over the data communications network with processing systems of the plurality of different issuing banks, the transaction processing system being configured to execute an account identification procedure comprising:

identifying, via communications with the plurality of different issuing banks, an issuing bank associated with a financial account holder;

on the basis of the identification of the issuing bank, retrieving issuing bank transmission data via the interface to enable the transmission of account identification request data, the issuing bank transmission data being dependent upon the identified issuing bank and identifying a selected account identification system associated with the identified issuing bank;

on the basis of the retrieved issuing bank transmission data, transmitting an account identification request via the interface to the selected account identification system associated with the identified issuing bank; and receiving an account identification response from the account identification system associated with the identified issuing bank via the interface in response to the account identification request, the account identification response identifying a financial account identity, the financial account identity including a Primary Account Number ("PAN") capable of being used in the authorization of at least one payment transaction, the at least one payment transaction being initiated as a result of a financial account holder conducting at least one order via at least one online merchant system, the transaction processing system being responsive to receiving said account identification response to execute a payment authorization request procedure, the payment authorization request procedure comprising:

a) generating a payment authorization request comprising transaction data including:

i) said PAN to be used in a payment transaction by the financial account holder;

ii) a merchant identity, associated with a first online merchant, as the payment transaction beneficiary; and iii) transaction detail including a payment amount; and b) transmitting the generated payment authorization request for subsequent processing by an acquiring bank payment processor system responsible for processing payment authorizations for an acquiring bank with which the first online merchant is associated.

23. The method of claim 1, wherein the PAN comprises a one-time-use PAN which is generated for one-time use.

24. The method of claim 1, comprising transmitting the generated payment authorization request to a merchant Internet Payment Service Provider system in order to further transmit the generated payment authorization request for subsequent processing by an acquiring bank payment processor system.

* * * * *